Patented Dec. 28, 1943

2,337,650

UNITED STATES PATENT OFFICE 2,337,650

FLUID FOR HYDRAULIC SYSTEMS

Frank E. Dolian, Terre Haute, Ind., assignor to Commercial Solvents Corporation, Terre Haute, Ind., a corporation of Maryland No Drawing. Application August 3, 1940, Serial No. 351,119

4 Claims. (Cl. 252—73)

My invention relates to fluids for hydraulic systems, and more specifically to improved compositions especially adapted for use as hydraulic brake fluids.

The usual hydraulic brake fluid comprises a lubricating component and a viscosity-reducing solvent. Since the common type of automobile hydraulic brake system necessitates contact of the brake fluid with rubber parts, petroleum lubricants cannot be employed, and up to the present time castor oil has been practically the only lubricant employed in commercial fluids of this type. Castor oil, however, has certain disadvantages, especially its characteristics at low temperature, and its acidity, which gives rise to corrosion problems.

I have now found that 2-methyl-2,4-pentanediol is an eminently satisfactory lubricant for use in hydraulic brake fluids. Fluids in which 2-methyl-2,4-pentanediol is employed as a lubricating component are clear and free-flowing even after long storage periods at sub-zero temperatures. Such fluids also have the advantage of decreased corrosive action, and embody the other desirable characteristics of hydraulic brake fluids, such as stability, minimum attack on rubber, freedom from vapor lock, and the like.

Brake fluids prepared in accordance with my present invention may employ 2-methyl-2,4-pentanediol as the sole lubricating component, or this material may be used in conjunction with castor oil, or other lubricant. In respect to the components other than the lubricating component, the brake fluids may be formulated in accordance with prior practices. Viscosity-reducing solvents, which have been employed in the past, are generally miscible with 2-methyl-2,4-pentanediol in the proportions necessary to secure a fluid of proper viscosity. I prefer to employ the monohydric aliphatic alcohols as viscosity-reducing solvents, although various other solvents, such as diacetone, ethylene glycol monoethyl ether, and the like, may also be employed.

When using the monohydric alcohols as viscosity-reducing solvents, and especially the less volatile alcohols, such as n-butyl alcohol, it is usually desirable to incorporate an additional agent to reduce the tendency of the alcohol to attack rubber. Glycerol is especially suitable for this purpose, although some of the lower molecular weight glycols may also be used. An added advantage of the use of 2-methyl-2,4-pentanediol, in accordance with my present invention, is the fact that this material serves as a blending agent or mutual solvent in certain cases, enabling sufficient glycerol to be incorporated in the fluid to minimize rubber attack, even when materials such as n-butyl alcohol, which have strong swelling action on rubber, are employed as viscosity-reducing solvents.

The proportions of the various components of the fluid may be varied in accordance with prior practices in this art. For use as hydraulic brake fluids, I prefer to employ 30–50% by volume of 2-methyl-2,4-pentanediol, the balance constituting the viscosity-reducing solvent, the inhibitor for rubber attack, and any other desired components of such fluid. For use in other hydraulic systems, such as damping systems, power transmission systems or pressure-transmission systems other than hydraulic brakes, the fluids may also be formulated in accordance with prior practices, merely substituting 2-methyl-2,4-pentanediol for part or all of the lubricating component.

My invention may further be illustrated by the following specific examples:

FLUID No. 1

2-Methyl-2,4-pentanediol 35%, castor oil 10%, n-butyl alcohol 50%, glycerol 5%.

FLUID No. 2

2-Methyl-2,4-pentanediol 45%, n-butyl alcohol 50%, glycerol 5%.

The above fluids were found to have the viscosity characteristics shown in Table I below:

Table I

| Fluid | Saybolt Universal viscosities (minutes) | | | Pour point |
|---|---|---|---|---|
|  | +75° F. | +32° | 0° | ° F. |
| Fluid No. 1 | 1.2 | 3.5 | 9.5 | −84 |
| Fluid No. 2 | 1.0 | 2.5 | 7.2 | −91 |

These fluids were compared with a standard commercial fluid designated herein as "Commercial fluid A," with respect to acidity and corrosion of various metals. In the corrosion tests, strips of various metals were exposed to the fluids for 25 days at 140° C. In each case strips of equal weight were employed in the different fluids, and the corrosion was measured by the weight lost in the test period. The acidity was determined by titration and calculated as grams of acetic acid per 100 ml. of fluid. The results are shown in Table II below:

*Table II*

| Fluid | Acidity | Weight loss (mg.) | | | |
|---|---|---|---|---|---|
| | | Steel | Brass | Solder | Aluminum |
| Commercial Fluid A | 0.08 | 0.6 | 3.1 | 549.2 | 0.2 |
| Fluid No. 1 | 0.04 | 0.1 | 1.4 | 108.6 | 0.0 |
| Fluid No. 2 | 0.007 | [1] 0.0 | 0.7 | 106.1 | [1] 0.0 |

[1] Slight gain in weight.

Fluids 1 and 2 were compared with commercial fluid A in a lubrication test in the Gray journal testing machine. A steel journal 5 inches in diameter by 10 inches long was rotated in a phosphor bronze bearing at a speed of 300 R. P. M., and the fluid was flooded on the journal at constant head. The coefficients of friction were determined at increasing loads, and the load was noted at the rupture of the lubricant film. As may be seen from the results in Table III below, Fluids 1 and 2 are superior to commercial fluid A at high loads.

*Table III*

| Fluid | Unit load (pounds per sq. in. of projected bearing area) | Coefficient of friction |
|---|---|---|
| Commercial Fluid A | 50.0 | 0.0046 |
| | 80.0 | 0.0041 |
| | [1] 110 | |
| Fluid No. 1 | 50.0 | 0.0039 |
| | 80.0 | 0.0036 |
| | [1] 147 | |
| Fluid No. 2 | 50.0 | 0.0038 |
| | 80.0 | 0.0039 |
| | 100 | 0.0040 |
| | 150 | 0.0038 |
| | [1] 182 | |

[1] Film of lubricant ruptured.

Fluids 1 and 2 were tested in a standard brake fluid testing machine employing standard automobile units of the Lockheed brake system. New rubber cups were employed in the master cylinder, and in the individual brake actuating cylinders, in each test. The testing machine was maintained at 70° C., and was operated continuously in each test for a period of 17 days at the rate of 15 strokes per minute, making a total of 367,200 strokes per test. There was no failure of the rubber cups in the tests with either Fluid No. 1 or Fluid No. 2. At the conclusion of the tests, the cups showed practically no mechanical wear or attack by the fluids, and both fluids were in very satisfactory condition.

It is to be understood, of course, that the two fluids described above are merely illustrative, and do not limit the scope of my invention. Various other formulations may be employed, as has previously been pointed out, and fluids containing 2-methyl-2,4-pentanediol as a lubricating component, may be employed in various other hydraulic systems, as well as in automobile hydraulic brake systems. It is to be understood that any such modifications of formulation or use, and the employment of any equivalents which would naturally occur to those skilled in the art, are included in the scope of my invention.

My invention now having been described, what I claim is:

1. A fluid adapted for use in hydraulic systems comprising 45 per cent 2-methyl-2,4-pentanediol, 50 per cent n-butyl alcohol, and 5 per cent glycerol.

2. A fluid adapted for use in hydraulic systems comprising 35 per cent 2-methyl-2,4-pentanediol, 50 per cent n-butyl alcohol, 5 per cent glycerol, and 10 per cent castor oil.

3. A brake fluid comprising n-butyl alcohol as a major component, sufficient glycerine to minimize any rubber attack of the alcohol, and a minor proportion of 2-methyl-2,4-pentanediol, in quantity sufficient to serve as a blending agent for the other components and thereby preventing clouding at low temperatures.

4. A brake fluid composition of the type specified in claim 3 and containing a small amount of castor oil not exceeding ten per cent.

FRANK E. DOLIAN.